United States Patent Office 2,741,393
Patented Apr. 10, 1956

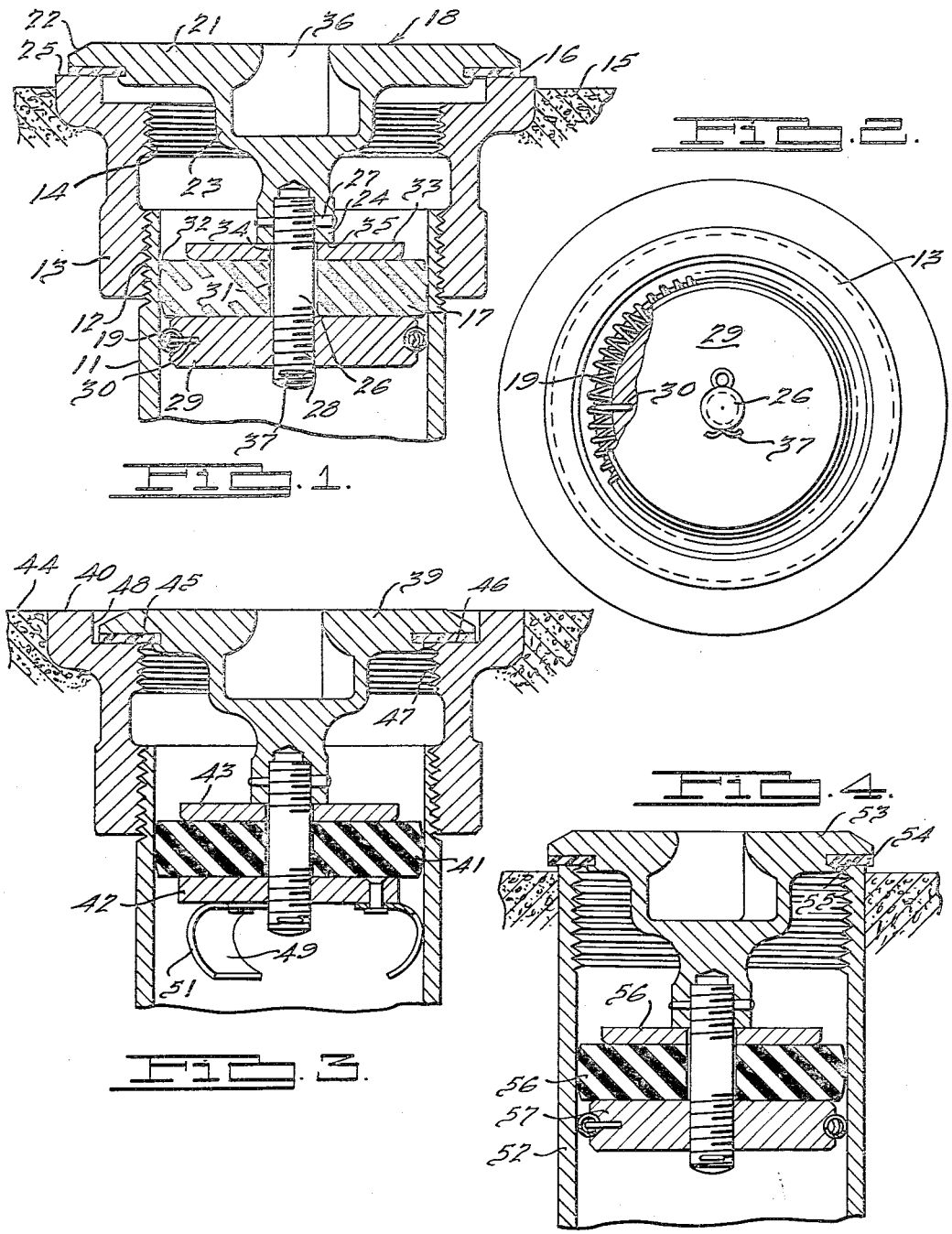

2,741,393

FILL CAP COVER

Louis J. Millard, Detroit, Mich., assignor of one-third to Floyd G. Yost and one-third to George L. Fowler, both of Detroit, Mich.

Application January 30, 1951, Serial No. 208,587

1 Claim. (Cl. 220—24.5)

This invention relates to closure members and in particular to sealing covers for closing the ends of tubular enclosures of conduits.

It is an object of the present invention to provide an improved cover for sealing the end of a tubular conduit, which is especially adapted for installations where highly volatile vapors must be prevented from leaving the conduit, and the possibility of dirt, water or other contaminating material entering the conduit must be minimized. More particularly, it is an object to provide a cover for sealing the fill conduit of a gasoline storage tank or similar compartment, which will prevent the escape of such vapors and will further prevent entrance of foreign matter into the conduit.

It is another object to provide an improved sealing cover as described, which is adapted for use with conduits having no threaded means for engaging the cover, or wherein threads originally provided have worn out and it is impractical or costly to replace the threaded portion. In association with this object, it is within my contemplation to provide a sealing cap which may be quickly and easily applied to the conventional fill box at the upper end of a riser for a gasoline or other storage tank, and which will efficiently seal the riser despite a deteriorated condition of the threads in the fill box.

It is also an object to provide a sealing cap cover as described, having two spaced-apart sealing portions and in which these sealing portions have a relatively great contact area with the walls of the conduit or the fill box, thus materially increasing the efficiency of the device.

Other objects and features of novelty of the invention will be specifically pointed out or will become apparent when referring, for a better understanding of the invention, to the following description taken in conjunction with the accompanying drawings, wherein:

Figure 1 is an elevational view, in cross-section, showing the novel sealing cap cover of my invention installed in a conduit having a fill box installed thereon;

Fig. 2 is a plan view looking upward of the cover of Fig. 1, showing the cooperation of the garter spring with the conduit;

Fig. 3 is an elevational view similar to that of Fig. 1 but showing a modified form of cover especially adapted for installations where a flush upper contour is desired; and Fig. 4 is an elevational view similar to Fig. 1 but showing a second modification of the cover adapted for conduits not having a fill box mounted thereon.

Although the inventive principles involved in the sealing cover are applicable to many different types of installations, the cover shown in the illustrated embodiments is especially adapted for conduits such as are found in underground storage installations. In such installations, it is conventional to have a fill pipe or riser 11 which leads upwardly from the underground tank (not shown) to the ground surface. The upper end 12 of conduit 11 is externally threaded, and a fill box 13 is threadably mounted on the conduit. This fill box is usually a casting of annular shape extending upwardly to the ground level and having an internal thread 14 which is adapted to receive a disc type of cap (not shown). In normal use the threads 14 will eventually become so worn that it is impossible to obtain an acceptable fit between the disc cap and the fill box, since the volatile fumes which escape past the cap will create a fire hazard. Since the replacement of the fill box would require the removal of the surrounding concrete 15, this procedure would be impractical and costly.

The novel sealing cap cover of my invention overcomes this problem by providing two sealing members 16 and 17 which effectively seal off the conduit from the atmosphere and which avoid the use of the threaded portion 14. The cap comprises a lid member generally indicated at 18, the lower or expanding sealing member 17, the upper or gasket sealing member 16, and a conduit gripping element 19. The lid 18 has an upper portion 21 of generally disc-like shape which may have a beveled outer edge 22. Extending downwardly from the central portion of disc 21 is a hub portion 23 which narrows to a stud-holding extension 24. The upper gasket 16, which may be made of any appropriate gasket material, is peripherally disposed on the underside of disc 21, and the diameter of the gasket as shown in Fig. 1 is such as to overlie the upper face 25 of the fill box 13. Secured within extension 24 of the lid is a stud 26, this stud being held against rotation relative to the lid by a pin 27. The stud may be either threaded into the lid as shown or may be otherwise secured thereto, and extends downwardly from extension 24, the lower end thereof being threaded as shown at 28. The combined axial extent of hub 23, extension 24, and threaded portion 28 is preferably such that the lower end of the stud will be substantially below the upper end of fill pipe 11. Threadably mounted on the lower end of stud 26 is an anchor plate 29, the anchor plate being of smaller diameter than the internal diameter of the fill pipe and preferably of circular shape. Mounted in a slot on the outside of the anchor plate is the gripping member 19, which is preferably a garter spring designed to frictionally grip the inner surface of the fill pipe. A pin 30 prevents relative rotation between the garter spring and the anchor plate.

The lower or expanding sealing member 17 is disposed directly above anchor plate 29 and preferably comprises a thick disc-shaped block of rubber or similar expandable and resilient material. This block has a clearance aperture 31 through which stud 26 extends. The peripheral surface 32 of the expanding member may be of convex shape and is so dimensioned as to fit snugly within fill pipe 11 when the expanding member is undistorted. Disposed immediately above expanding member 17 is an expander plate 33 having a clearance aperture 34 through which a stud 26 extends. The lower surface of expander plate 33 overlies expanding member 17, and the upper surface of the expander plate is engaged by the lower end 35 of extension 24. A socket 36 is centrally located in lid 18 and extends downwardly within hub 23. This socket may be of a bayonet shape, thus providing a receptacle for a tool (not shown) which may be used for applying or removing the sealing cap cover. A cotter pin 37 may be provided in the lower end of stud 26 to prevent the accidental removal of the elements of the cap.

In operation, the adjustment of the cover before installation will normally be such that there is no distortion of expanding member 17. In other words, the spacing of anchor plate 29 and expander plate 33 will be such that there are no compressive forces acting on member 17. When in this condition the cover may be inserted within the fill box 13 and downwardly into the fill pipe 11, member 17 fitting snugly within the pipe, until gasket 16 engages upper surface 25 of the fill box. A tool may then be inserted within socket 36 and the lid 18 rotated. This action will rotate stud 26 in such a direction as to draw anchor plate 29 upwardly by means of threads 28. It will be observed that during this action anchor plate 29 will be prevented from rotative movement by means of the frictional gripping action of garter spring 19. Since lid 18 does not rotate relative to stud 26, the upward axial movement of anchor plate 29 will cause expanding member 17 to be compressed between plates 29 and 33. This action will cause the expanding member to be spread radially outwardly so that a greater portion of peripheral surface 32 will engage the inner surface of the fill pipe. Continued rotation of the lid 18 will increase the radial compressive force of the expanding member, causing a tight sealing action. When the expanding member 17 is in tight gripping relation with the fill pipe, further rotation of the lid will cause a downward force to be exerted through stud 26 and upon disc 21, thus forcing gasket 16 downwardly upon surface 25. It will be seen, therefore, that a double sealing arrangement is accomplished, the sealing members 16 and 17 being in spaced relation. When it is desired to remove the sealing cap cover, it is merely necessary to rotate lid 18 in opposite direction, thus axially spreading plates 29 and 33 and releasing the compressive force on the expanding member 17.

Fig. 3 illustrates a modification of the invention which is generally similar to that of Fig. 1 and which employs a lid 39, and expanding member 41 and expanding plates 42 and 43. This embodiment is designed, however, for installations having fill box the upper surface 40 of which is flush with the level of the concrete 44. In such installations it may be desired that the upper surface of lid 39 be flush with surface 43. The lid is therefore constructed so that the gasket 45 seals against an inner annular surface 46 of the fill box which is below the level of upper surface 43. It will be understood that the type of fill box which is in conventional use will ordinarily have a radial surface 46 immediately above the threaded portion 47. The diameter of lid 39 in this modification is made sufficiently narrow as to clear the peripheral wall 48, and the thickness of the lid is such as to be flush with the upper surface of the fill box. In this modification, the garter spring is replaced by a plurality of plate spring gripping members 49 secured to the underside of plate 42. Members 49 are of arcuate shape so as to present a convex surface to the interior surface of the fill pipe, and the outer surfaces 51 of the springs will grip the inner surface of the fill pipe to prevent rotation.

Fig. 4 illustrates a second modification of the invention which is generally similar in construction with the embodiments of Figs. 1-3 but which is especially adapted for installations wherein no fill box is used, the fill pipe 52 extending directly to the ground surface. In this installation the lid 53 will be of such diameter that the gasket 54 will directly engage the upper edge 55 of the fill pipe.

The lid extends downwardly within the fill pipe and the plates 56 and 57 will control the expansion member 58 in the manner heretofore described.

While it will be apparent that the preferred embodiments of the invention herein disclosed are well adapted to fulfill the objects and advantages previously stated, it will be apparent that various changes and modifications may be made without departing from the spirit and scope of the appended claim.

What is claimed is:

A removable sealing device for a conduit comprising a lid, the outer periphery of which is of a larger diameter than the inside diameter of said conduit, a gasket on the inner face of said lid for engaging the end of said conduit, an inward extension on said lid projectable into said conduit, an elongated member having one end secured to said extension and the opposite end thereof threaded and disposed inwardly of said extension, an anchor plate threadedly connected with the threaded end of said elongated member at a position substantially axially spaced from the said inner face of said lid, gripping means rigidly connected with said anchor plate and extending beyond the outer edges thereof and frictionally engageable with the wall of the conduit for preventing rotation of said anchor plate while permitting axial movement thereof relative to said conduit to permit said device to be easily removed from the conduit, an expander plate freely mounted on said elongated member between said extension and said anchor plate, the inner end of said extension being engageable with said expander plate, a disk shaped block of resilient material disposed between said anchor plate and said expander plate, the outer peripheral surface of said block of resilient material being of a diameter such as to snugly engage the inner surface of the conduit when the block is undistorted, whereby rotation of said lid and its elongated threaded member will draw together said plates so as to radially expand said block of resilient material into tight sealing engagement with the wall of the conduit and said gasket is brought into tight sealing engagement with the end of said conduit.

References Cited in the file of this patent

UNITED STATES PATENTS

| | | |
|---|---|---|
| 303,558 | Campbell | Aug. 12, 1884 |
| 361,030 | Sprogle | Apr. 12, 1887 |
| 739,589 | Clifford | Sept. 22, 1903 |
| 955,500 | Clark | Apr. 19, 1910 |
| 1,043,298 | Clark | Nov. 5, 1912 |
| 1,446,223 | Thompson et al. | Feb. 20, 1923 |
| 2,324,545 | Svirsky | July 20, 1943 |
| 2,564,232 | Rousenberger | Aug. 14, 1951 |

FOREIGN PATENTS

| | | |
|---|---|---|
| 102,935 | Great Britain | 1918 |